United States Patent [19]
Ito

[11] Patent Number: 5,120,082
[45] Date of Patent: Jun. 9, 1992

[54] MUD GUARD WITH REINFORCEMENT FILM

[75] Inventor: Tetsuo Ito, Chiba, Japan

[73] Assignee: Kinugawa Rubber Industrial Co., Ltd., Chiba, Japan

[21] Appl. No.: 674,873

[22] Filed: Mar. 25, 1991

[30] Foreign Application Priority Data

Mar. 26, 1990 [JP] Japan .................................. 2-75821

[51] Int. Cl.[5] ............................................ B62B 25/16
[52] U.S. Cl. ..................................... 280/851; 280/848
[58] Field of Search ................ 280/847, 848, 851, 154

[56] References Cited

U.S. PATENT DOCUMENTS

| 4,012,053 | 3/1977 | Bode | 280/851 |
|---|---|---|---|
| 4,709,938 | 12/1987 | Ward et al. | 280/851 |
| 4,927,177 | 5/1990 | Price | 280/851 |

FOREIGN PATENT DOCUMENTS 2318064  2/1977  France .................................. 280/851

Primary Examiner—Andres Kashnikow
Assistant Examiner—Richard Camby
Attorney, Agent, or Firm—Bachman & LaPointe

[57] ABSTRACT

A mud guard for use with an automotive vehicle having rear wheels and a fender panel having a corner behind each of the rear wheels. The mud guard comprises a fixture portion for attachment of the mud guard to the fender panel, a skirt portion continued from the fixture portion, and a flange portion formed between the fixture and skirt portions. The flange portion is tuned to form a fender guard for covering the corner of the fender panel. The fixture, skirt and flange portions are made integrally of a soft material. The mud guard also includes a reinforcement film formed on the fixture portion. The reinforcement film is made of a hard material.

5 Claims, 2 Drawing Sheets

MUD GUARD WITH REINFORCEMENT FILM

BACKGROUND OF THE INVENTION

This invention relates to a mud guard for use with an automotive vehicle and, more particularly, to such a mud guard of the type having a fender guard.

Normally, mud guards designed for use with automotive vehicles include a fixture portion and a skirt portion attached through the fixture portion to the fender panel for guarding mud splashed from the vehicle rear wheel. The fixture portion is formed of a metal plate to provide a sufficient strength of attachment of the mud guard to the fender panel. The skirt portion is made of a soft material to provide a necessary degree of flexibility.

One problem with such conventional mud guards is the tendency toward breakage due to stress concentration at the connection between the skirt and fixture portions made of different materials.

SUMMARY OF THE INVENTION

Therefore, it is a main object of the invention to provide an improved mud guard which is free from breakage due to stress concentration at the connection between the skirt and fixture portions of the mud guard.

There is provided, in accordance with the invention, a mud guard for use with an automotive vehicle having rear wheels and a fender panel having a corner behind each of the rear wheels. The mud guard comprises a fixture portion for attachment of the mud guard to the fender panel, a skirt portion continued from the fixture portion, and a flange portion formed between the fixture and skirt portions. The flange portion is turned to form a fender guard for covering the corner of the fender panel. The fixture, skirt and flange portions are made integrally of a soft material. The mud guard also includes a reinforcement film formed on the fixture portion. The reinforcement film is made of a hard material.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
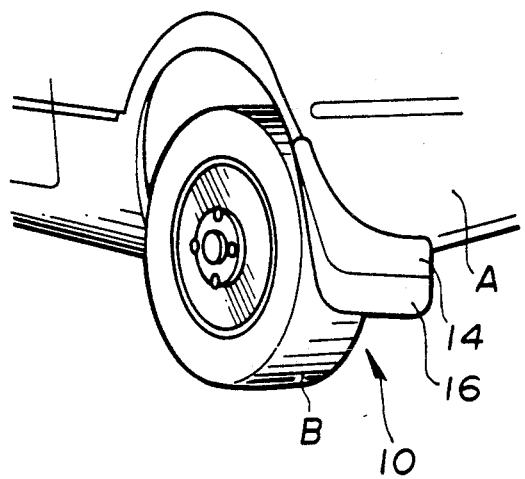
FIG. 1 is a perspective view showing a prior art mud guard mounted on an automotive vehicle.
Figure 2:
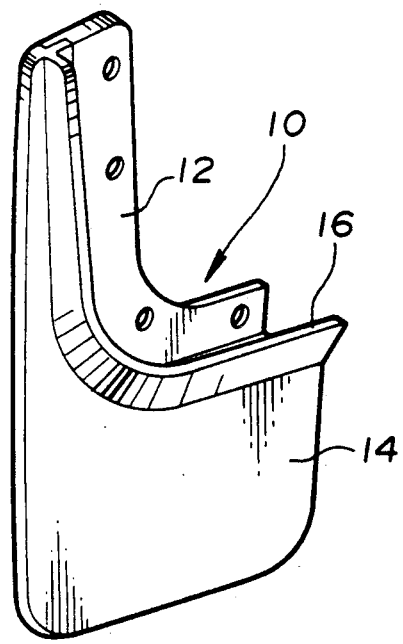
FIG. 2 is an enlarged perspective view of the prior art mud guard of FIG. 1.

Prior to the description of the preferred embodiment of the present invention, a prior art mud guard of FIGS. 1 and 2 is briefly described in order to provide a basis for a better understanding of the difficulties attendant thereon.

In FIGS. 1 and 2, the character A designates a fender panel of an automotive vehicle and the character B designates a rear wheel of the automotive vehicle. The mud guard, generally designated by the numeral 10, is attached to the fender panel A at its one corner behind the rear wheel B. The mud guard 10 has a fixture portion 12 for fixture to the inner surface of the fender panel A. The fixture portion 12 is an L-shaped metal plate to provide a sufficient strength of attachment of the mud guard 10 to the fender panel A. The mud guard 10 also has a skirt portion 14 formed integrally with the fixture portion 12. The skirt portion 14 expands on the same plane as the fixture portion 12. The skirt portion 14 has a flange 16 formed along the curve on which the fixture and skirt portions 12 and 14 are connected. The flange 16 is turned to form a fender guard for covering the corner of the fender panel A. The skirt portion 14 is made of a soft material in order to avoid breakage.

One problem with such a conventional mud guard 10 is the tendency of the mud guard 10 to break due to stress concentration at the connection between the fixture and skirt portions 12 and 14 made of different materials. Additionally, the metal made fixture portion 12 gathers rust.

Figure 3:
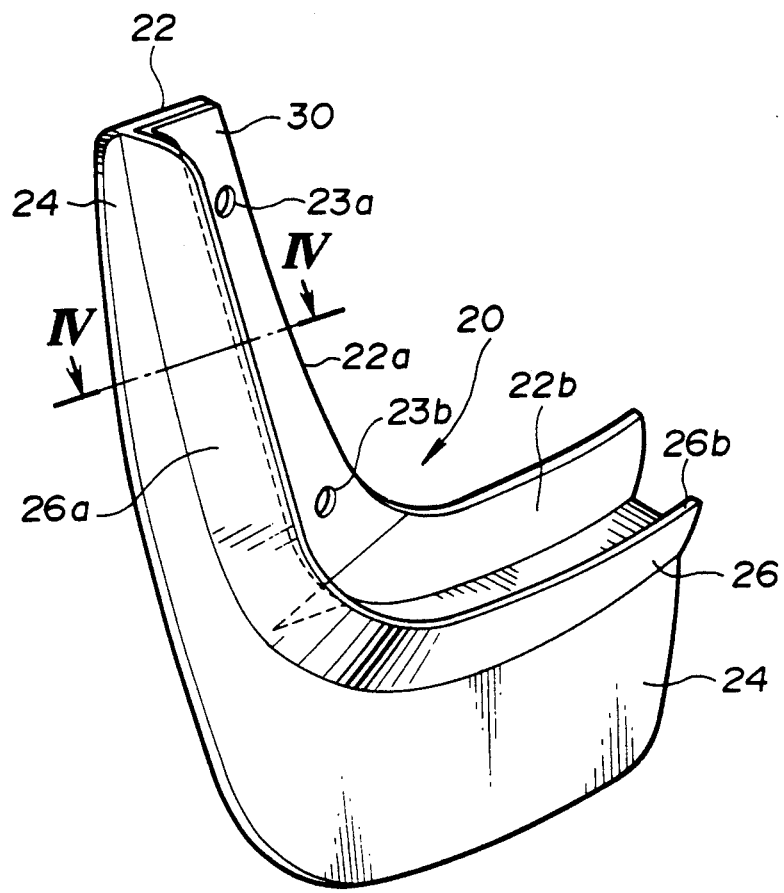
FIG. 3 is a perspective view showing one embodiment of a mud guard made in accordance with the invention.
Figure 4:
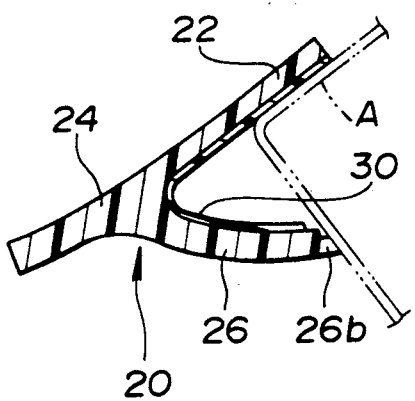
FIG. 4 is a sectional view taken on line IV—IV in FIG. 3.

Referring to FIGS. 3 and 4, there is shown one embodiment of a mud guard made in accordance with the invention. In this invention, the mud guard, generally designated by the numeral 20, includes a fixture portion 22, a skirt portion 24 and a flange portion 26, all made integrally of a soft material such as soft polyvinyl chloride through an extrusion technique. The fixture and skirt portions 22 and 24 are on the same plane. The flange portion 26 is formed along a curve between the fixture and skirt portions 22 and 24. The flange portion 26 has an upper portion 26a extending substantially at right angles with respect to the skirt portion 24 and a lower portion 26b turned to form a fender guard for covering the corner of the fender panel A (FIG. 1). The fixture portion 22 has an upper portion 22a formed with bolt holes 23a and 23b for attachment of the mud guard 20 to the inner surface of the fender panel A, and a lower portion 22b continued from the fender guard (the lower portion 26b of the flange portion 26). The mud guard 20 also has a reinforcement film 30 formed on the continuous surface of the the fixture and flange portions 22 and 26 to provide a sufficient strength of attachment of the mud guard 20 to the fender panel A. The hard film 30 may be formed by coating a glass fiber reinforced hard resin such as an epoxy resin containing glass fiber on the required area and hardening the coated glass fiber reinforced hard resin. The thickness of the reinforcement film 30 is selected to provide a necessary strength of attachment of the mud guard 20 to the inner surface of the fender panel A. It is preferable to provide a sufficient degree of flexibility to the fender guard by forming the reinforcement film 30 only on the surface of the upper portions 22a and 26a of the fixture and flange portions 22 and 26, as best shown in FIG. 3. The reinforcement film 30 may be formed only on the fixture portion 22 or only on the upper portion 22a of the fixture portion 22.

According to the invention, the reinforcement film 30 is formed to provide a sufficient degree of rigidity for the fixture portion 22 of the mud guard 20. The mud guard has no metal portion. This is effective to eliminate the tendency of the fixture portion 22 to be rusted. Additionally, the fixture and skirt portions 22 and 24 are made of the same material. This is effective to eliminate the tendency of the mud guard to be broken due to stress concentration at the connection between the fixture and skirt portions.

What is claimed is:

1. A mud guard for use with an automotive vehicle having rear wheels and a fender panel having a corner behind each of the rear wheels, the mud guard comprising a fixture portion for attachment of the mud guard to the fender panel, a skirt portion continued from the fixture portion, and a flange portion formed between the fixture and skirt portions, the flange portion being turned to form a fender guard for covering the corner of the fender panel, the fixture, skirt and flange portions being made integrally of a soft resin, and a hard resin coated to form a reinforcement film on the fixture portion.

2. The mud guard as claimed in claim 1, wherein the soft resin is soft polyvinyl chloride and the hard resin is a glass fiber reinforced hard resin.

3. The mud guard as claimed in claim 1, wherein the reinforcement film is formed on the fixture portion and on the flange portion.

4. The mud guard as claimed in claim 1, wherein the fixture portion has a first portion for fixture to the fender panel and a second portion continued from the fender guard, and wherein the reinforcement film is formed on the first portion of the fixture portion and formed on the flange portion except for the fender guard.

5. A mud guard as claimed in claim 1 wherein the fixture and skirt are on the same plane and wherein the flange portion has an upper portion extending substantially at right angles with respect to the skirt portion and a lower portion turned to form a fender guard.

* * * * *